United States Patent Office 3,452,259
Patented June 24, 1969

3,452,259
MOVING COIL TRANSDUCER CONTROL SYSTEM
Shmuel Shtrikman, Rehovoth, Israel, and David Treves, Palo Alto, Calif., assignors, by mesne assignments, to the United States of America
Continuation-in-part of application Ser. No. 381,165, July 8, 1964. This application Apr. 18, 1967, Ser. No. 631,829
Int. Cl. G05b 11/01
U.S. Cl. 318—21
2 Claims

ABSTRACT OF THE DISCLOSURE

An electromechanical transducer including a movable part which can be used to support a desired object which is to be moved at a predetermined constant velocity relative to a stationary member, such as supporting and moving a suitable radioactive source relative to a suitable absorber. The movable member of the transducer carries two windings, a driving coil for the movement thereof and a sensing coil which is proportional to velocity, the output of which is fed back to control the voltage applied to the driving coil.

---

Figure 1:
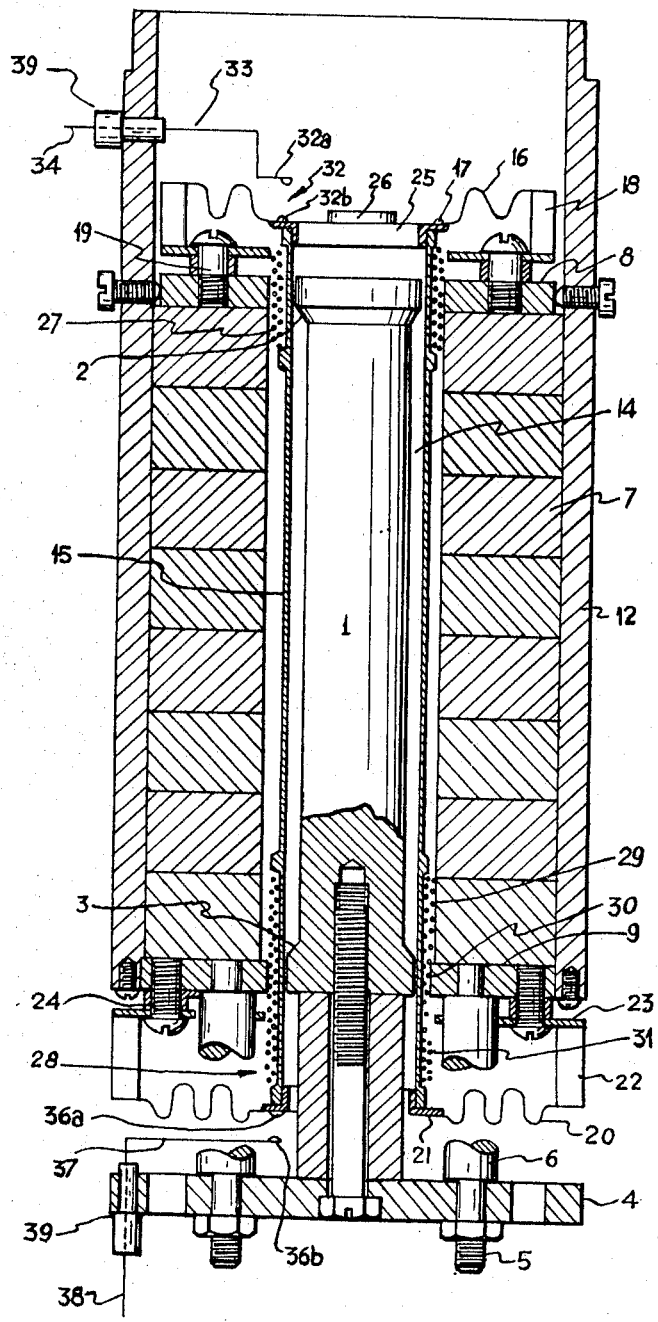

The present application is a continuation-in-part of our copending United States application Ser. No. 381,165, filed July 8, 1964, now abandoned.

The present invention relates to an electromechanical transducer having a movable part adapted to support an object which is to be moved at a predetermined constant or varying velocity with respect to a stationary member, the movable part being located in a magnetic field and being provided with a driving coil which is fed with a fixed or variable input voltage and with a sensing coil in which is induced a voltage which is proportional to the velocity of the movable part, this induced voltage being fed back to the driving coil so as to ensure that the velocity of the movable part is directly proportional to the input voltage.

The novel transducer has been particularly designed for the purpose of carrying out so-called Mossbauer experiments. These experiments are based on the observation that when a relative velocity is imparted to a radioactive source with respect to an absorber, a Doppler shift of the apparent energy of the relevant nuclear transition can be observed. The variation of the absorption with relative velocity is of particular interest to the physicist and in order to observe and measure this variation means must be provided for supporting and displacing the radioactive source at a predetermined constant or variable velocity with respect to the fixed absorber, or alternatively for displacing the absorber with respect to a fixed source.

It is an object of the present invention to provide a new and improved electromechanical transducer which is readily capable of use for supporting and displacing a source of gamma radiation such as, for example, $^{57}CO$ under such conditions as to facilitate the carrying out of Mossbauer experiments.

According to the present invention there is provided a electromechanical transducer for moving an object at a predetermined velocity along a predetermined path comprising in combination an elongated coil support member, an object carrier integral with an end of the coil support member, a first coil carried by the coil support member adjacent one of its ends, a second coil carried by the coil support member adjacent the other end, means for providing a strong permanent magnetic field through the median portions of both coils in which means said coil support member is resiliently suspended and through which means said coil support member is axially displaceable, a voltage source, an operational amplifier having an input coupled to the voltage source and an output coupled to said first coil so as to displace said coil support member along a predetermined path at a velocity which is a function of the applied voltage, coupling means for coupling said second coil to said operational amplifier whereby the second coil serves as a velocity sensing coil in which is induced as voltage which is a function of the velocity of the coil support member, contact means located along said predetermined path so as to be actuated by said coil support member after having been displaced a predetermined distance along said path, a voltage pulse generator coupled to said contact means and adapted to be triggered upon actuation of the contact means so as to generate a voltage pulse, coupling means for coupling said voltage pulse generator to said operational amplifier so as to apply a voltage pulse to the first coil so as to return the coil support member to its initial position.

In accordance with a preferred embodiment of the present invention the coil support member is arranged to be driven by voltage pulses produced in a voltage pulse generator which feeds the input of the operational amplifier the output of which is coupled to the first coil, the contact means in this case are coupled to the voltage pulse generator so as to trigger these pulses in synchronism with the displacement of the coil support member by said predetermined distance.

Figure 2:
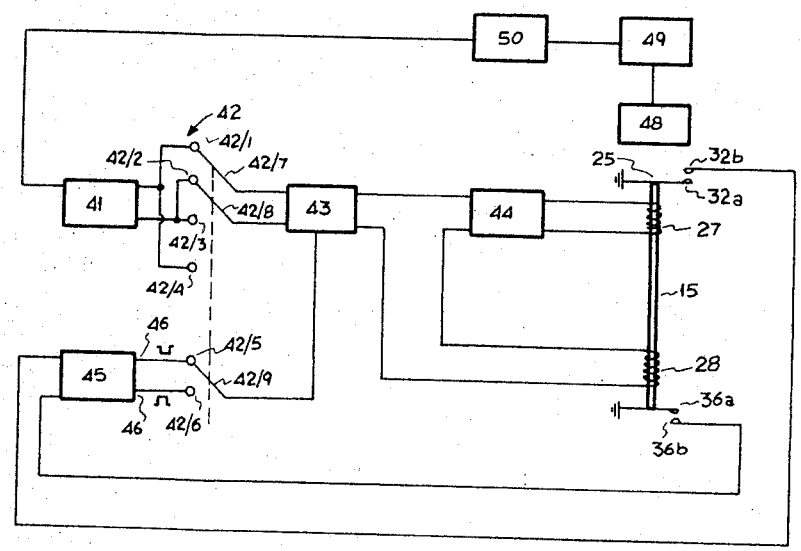
Figure 3:
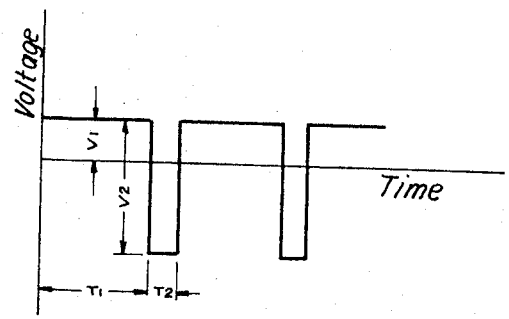
Figure 4:
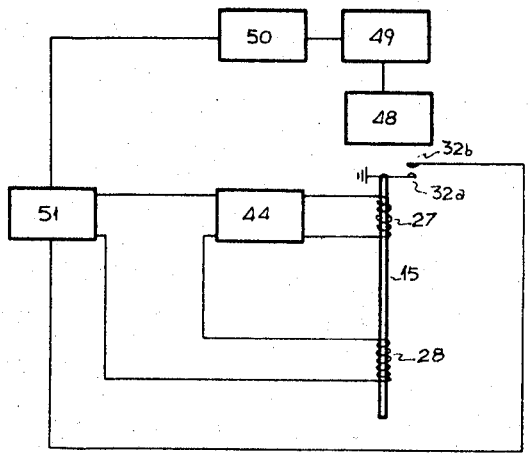
Figure 5:
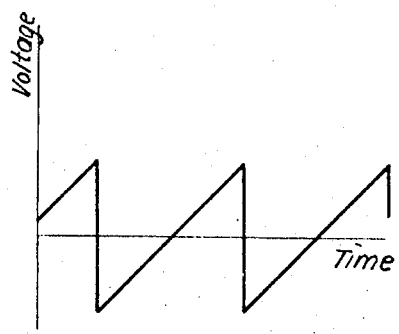

For a better understanding of the present invention and to show how the same can be carried out in practice reference will now be made to the accompanying drawings in which:

FIGURE 1 is a longitudinally sectional elevation of the transducer in accordance with the present invention, FIGURE 2 is a schematic circuit diagram illustrating the electrical connection of a transducer in accordance with the invention for carrying out a Mossbauer experiment, FIGURE 3 shows the variation of the voltage applied to the drive coil shown in FIGURE 2 with time, FIGURE 4 is a schematic circuit diagram showing a further form of connection of the transducer for carrying out a Mossbauer experiment, and FIGURE 5 shows the variation of the voltage applied to the drive coil shown in FIGURE 4 with time.

As seen in FIGURES 1 and 2 of the drawings the transducer comprises a central elongated cylindrical soft iron core 1 having upper and lower outwardly flanged ends 2 and 3. Secured to the lower end 3 is a base plate 4 which is bolted to the core 1 by means of bolts 5 and via an intermediate spacing member 6.

A plurality of annular permanent magnets 7 surround the central core 1 and are provided with upper and lower soft iron annular pole pieces 8 and 9, respectively disposed opposite the upper and lower flanged ends 2 and 3 of the core. The annular permanent magnets 7 are magnetized in a direction parallel to the axis of the transducer so as to define differing magnetic poles at the upper and lower surfaces of the magnets. In consequence the polarity of the pole pieces 8 and 9 differ. The upper and lower narrow gaps between the pole pieces 8 and 9 and the flanged core ends 2 and 3 are bridged by strong magnetic fields and constitute upper and lower air gaps of permanent magnetic flux paths. The lower pole piece 9 which supports the superimposed annular magnets 7 is secured to the base plate 4 by means of bolts 10 which pass through tubular spacer elements 11. The permanent magnets 7 are surrounded by an outer cylindrical metal casing 12 which is held in position by means of a pair of bolts 13 which pass through the casing 12 and abut the upper pole piece 8.

Located in the annular cylindrical gap 14 between the central core 1 and the permanent magnet 7 is a movable member constituted by a thin rigid elongated tubular coil support member 15.

The coil support member 15 is centrally supported in an annular gap 14 by means of three corrugated spring strips 16 which are radially disposed and are secured at their inner ends to the upper flanged rim 17 of the coil support member and are secured at their outer ends to upwardly directed brackets 18 formed integrally with a ring shaped member 19 coaxial with the tubular coil support member 15 and bolted to the upper pole piece 8 by means of bolts 19.

Similarly the lower end of the tubular coil support member 15 is centered by means of three corrugated springs 20 which are radially disposed and which are secured at their inner ends to the lower flanged rim 21 of the coil support member 15 and at their outer ends to downwardly directed brackets 22 formed integrally with a ring 23 which is bolted by means of bolts 24 to the lower pole piece 9.

A supporting disc 25 is secured to the upper rim 17 of the coil support member 15 and supports an object 26 to be displaced which, in the case of the Mossbauer experiments, is a gamma ray source.

Wound adjacent the upper end of the coil support member 15 opposite the upper pole piece 8 is a double layer drive coil 27 whilst wound adjacent the lower end of the coil support member 15 opposite the lower pole piece 9 is a velocity sensing coil 28.

The drive coil 27 has a length which is approximately three times the length of the upper air gap, the drive coil 27 being wound in such a direction that the passage of current through this coil results in the movement of the coil support member 15 in an axial direction.

The velocity sensing coil 28 consists of three adjacent sections 29, 30 and 31, the length of the intermediate section 30 being equal to the sum of the length of the two outer sections 29 and 31 these two outer sections being wound in one sense whilst the intermediate section 30 being wound in the opposite sense.

In practice it is only the central section 30 which is employed for sensing the motion of the coil support member 15, whilst the two outer sections 29 and 31 are employed to compensate for the effect of stray magnetic fields and of the possible effects of the magnetic field of the drive coil 27.

An upper contact means 32 consists of a contact 32a mounted on the upper flanged rim 17 of the coil support member 15 and a contact 32b mounted on a springy arm 33 the lead 34 to the contact 32b extending out of the metal casing 12 via an insulator bushing 35. Lower contact means 36 consists of a contact 36a mounted on the lower flanged rim 21 of the coil support member 15 and a contact 36b mounted on a springy arm 37 the electrical lead 38 connected to the contact 36b extending through the base plate 4 via an insulator bushing 39.

All constituent components of the transducer apart from the components 1, 7, 8 and 9 are formed of non-magnetic material.

The mode of connection and operation of the transducer just described in carrying out a Mossbauer experiment will now be explained with reference to FIGURE 3 of the accompanying drawings. As seen in this figure, a unidirectional voltage output unit 41 is connected via a velocity reversing switch 42 to the input of a summing network 43 one output terminal of the summing network 43 being connected to one input terminal of an operational amplifier 44 whilst the other output terminal of the summing network 43 is connected via the sensing coil 28 to the other input terminal of the operational amplifier 44. The output of the operational amplifier 44 is connected to the drive coil 27.

The contact 32b of the upper contact means 32 is connected to a first input of a pulsing circuit 45 whilst the contact 36b of the lower contact means 36a is connected to a second input of the pulsing circuit 45. The two outputs of the pulsing circuit 45 are connected via the velocity reversing switch 42 to the summing network 43.

Located directly above the movable supporting disc 25 is a gamma ray absorber 48, the intensity of the gamma rays passing through the absorber being measured by a radiation detection unit 49 and being recorded as a function of the voltage output of the voltage supply unit 41 by means of a recorder unit 50.

The voltage reversal switch 42 is provide with six fixed contacts 42/1, 42/2, 42/3, 42/4, 42/5 and 42/6 and three movable contacts 42/7, 42/8 and 42/9. The fixed contacts 42/1 and 42/4 are both connected to the positive output of the voltage supply unit 41 whilst the fixed contacts 42/2 and 42/3 are both connected to the negative output of the voltage supply unit 41. The movable contacts 42/7 and 42/8 are respectively connected to two of the input terminals of the summing network 43. The fixed contact 42/5 is connected to a first output 46 of the pulsing network 45 from which is designed to emerge a negatively directed pulse as shown schematically in the figure whilst the fixed contact 42/6 is connected to the other output 46 of the pulsing network 45 from which is designed to emerge a positively directed pulse as shown schematically in the figure. The movable contact 42/9 is connected to the third input terminal of the summing network 43. The movable contacts 42/7, 42/8 and 42/9 of the velocity revresing switch 42 are ganged together so that when, as shown in the figure, the movable contacts 42/7 and 42/8 contact the fixed contacts 42/1 and 42/2, the movable contact 42/9 contacts the fixed contact 42/5. When, on the other hand, the movable contacts 42/7 and 42/8 respectively contact the fixed contacts 42/3 and 42/4, the movable contact 42/9 contacts the fixed contact 42/6. In consequence therefor when a positive drive voltage is applied from the voltage supply unit 41 through the contacts 42/1 and 42/2 to the summing network 43 and in consequence via the operational amplifier 44 to the drive coil 27 a negatively directed pulse is applied from the pulsing unit 45 through the output 46, fixed contact 42/5 to the summing network 43 and thereby via the operational amplifier 44 to the drive coil 27. When on the other hand a negative drive voltage is applied from the voltage supply unit to the fixed contacts 42/3 and 42/4 to the summing network 43 and therefrom through the operational amplifier 44 to the drive coil 27 a positively directed pulse is applied from the output 46 to the pulsing unit 45 through the fixed contact 42/6 to the summing network 43 and from there to the operational amplifier 44 to the drive coil 27.

In operation, and with the contacts of the velocity reversing switch 42 in the positions as shown in the drawings, a positive output voltage $V_1$ (see FIG. 3) is applied via the operational amplifier 44 to the drive coil 27. As a result the coil support member 15 is displaced upwardly at a constant velocity. The velocity sensing coil 28 has induced therein a voltage which is a direct function of the velocity and this voltage is fed back to the operational amplifier 44 and in this way a feed back to produced which results in the velocity of the coil support member 15 being directly proportional to the voltage $V_1$.

When the coil support member 15 has been displaced by a predetermined distance (after a time $T_1$ as shown in FIG. 3) the contact 32a makes contact with the upper contact 32b and in consequence the pulsing network 45 is actuated and a negatively directed pulse ($V_2$ in FIG. 3) is fed from the output 46 to the summing network 43 and this negatively directed pulse is effective in returning the coil support member 15 to its initial position.

As seen in FIGURE 3 of the drawings the pulse width $T_2$ of the negatively directed restoring pulse (fly back period) is a very small fraction of $T_1$ which is in fact the active period and, in consequence, counting of the radiation by the detector 49 can proceed continuously.

In order to ensure that no average displacement of the support coil member 15 takes place the positive and negative areas of the voltage time curve as seen in FIGURE 3 of the drawings must be kept equal. By the provision of the contact means the pulse generator is always triggered as the coil support member reaches the predetermined position. Thus, whilst $V_1$ can be changed in order to obtain the various velocities required for carrying out the experiment the product $T_2V_2$ remains the same whilst $T_1$ changes in such a way that the product $T_1V_1$ remains constant.

If it is desired to reverse the direction of the voltage the velocity reversal switch 42 is reversed so that the movable contacts 42/7, 42/8 make respective contact with the fixed contacts 42/3 and 42/4 whilst the movable contact 42/9 makes contact with the fixed contact 42/6. Under these circumstances a constant negative voltage is applied to the drive coil 27 and the coil support member 15 is displaced downwardly, a positively directed returning pulse being fed from the pulsing unit 45 through the output 46 to the summing network 43 when the lower contacts 36a and 36b make contact.

In one practical embodiment the transducer had air gaps of about 1 mm. width and of 6 mm. length, the drive coil being of 20 mm. length. With such an arrangement a typical amplitude of motion in the axial direction of the transducer with a maximum velocity of 1.2 cm. per second and a fly back time of less than 3% of the active time is about 6 mm.

In a modified arrangement shown in FIGURE 4 of the drawings a voltage pulsing unit 51 is employed to supply a varying voltage to the drive coil 27 via the operational amplifier 44. As seen in FIGURE 5 of the drawings the unit 51 supplies saw tooth pulses. In order to ensure that there is no average displacement of the coil support member 15 it is necessary to ensure that the positive and negative areas of the voltage-time curve shown in FIGURE 5 of the drawings are equal. This is automatically achieved by coupling the contact means 32 to the voltage pulse unit 51 so that the pulse fly back is always initiated when the coil support member 15 reaches a predetermined position at which position the contacts 32a and 32b are closed.

Thus whilst in the first embodiment described above the contact means are used to trigger off a return pulse which is superimposed on the constant drive voltage applied to the drive coil so as to return the coil support member to its initial position, in the second embodiment the contact means are used to ensure that the fly back period of the voltage pulses applied to the drive coil always starts when the coil support member has reached a predetermined position. In both cases the contact means effectively provide a form of positional feed back as distinguished from the velocity feed back provided by the velocity sensor coil 28.

We claim:

1. An electromechanical transducer for moving an object at a predetermined velocity along a predetermined path comprising in combination an elongated coil support member, an object carrier integral with an end of the coil support member, a first coil carried by the coil support member adjacent one of its ends, a second coil carried by the coil support member adjacent the other end, means for providing a strong permanent magnetic field through the median portions of both coils in which means said coil support member is resiliently suspended and through which means said coil support member is axially displaceable, a voltage source, an operational amplifier having an input coupled to the voltage source and an output coupled to said first coil so as to displace said coil support member along a predetermined path at a velocity which is a function of the applied voltage, coupling means for coupling said second coil to said operational amplifier whereby the second coil serves as a velocity sensing coil in which is induced a voltage which is a function of the velocity of the coil support member, contact means located along said predetermined path so as to be actuated by said coil support member after having been displaced a predetermined distance along said path, a voltage pulse generator coupled to said contact means and adapted to be triggered upon actuation of the contact means so as to generate a voltage pulse, coupling means for coupling said voltage pulse generator to said operational amplifier so as to apply a voltage pulse to the first coil so as to return the coil support member to its initial position.

2. An electromechanical transducer for moving an object at a predetermined velocity along a predetermined path comprising in combination an elongated coil support member, an object carrier integral with an end of the coil support member, a first coil carried by the coil support member adjacent one of its ends, a second coil carried by the coil support member adjacent the other end, means for providing a strong permanent magnetic field through the median portions of both coils in which means said coil support members is resiliently suspended and through which means said coil support member is axially displaceable, a voltage pulse generator, an operational amplifier having an input coupled to the voltage pulse generator and an output coupled to said first coil so as to displace said coil support member along a predetermined path at a velocity which is a function of the applied voltage, coupling means for coupling said second coil to said operational amplifier whereby the second coil serves as a velocity sensing coil in which is induced a voltage which is a function of the velocity of the coil support member, contact means located along said predetermined path so as to be actuated by said coil support member after having been displaced a predetermined distance along said path, coupling means for coupling said contact means to said voltage pulse generator so as to trigger said pulses in synchronism with the displacement of said coil support member by said predetermined distance.

References Cited

UNITED STATES PATENTS

| | | | |
|---|---|---|---|
| 2,764,702 | 9/1956 | Mason | 310—27 XR |
| 2,853,667 | 9/1958 | Booth et al. | 310—27 XR |
| 3,130,943 | 4/1964 | Berresheim et al. | 310—27 XR |
| 3,172,025 | 3/1965 | Jones et al. | 318—22 |
| 3,331,239 | 7/1967 | Larsen et al. | 318—128 XR |

J. D. MILLER, *Primary Examiner.*

D. F. DUGGAN, *Assistant Examiner.*

U.S. Cl. X.R.

310—27; 318—128